Dec. 10, 1940.　　　　R. W. KROUT　　　　2,224,400
CANDY-MAKING MACHINE
Filed Nov. 29, 1938　　　　7 Sheets-Sheet 2
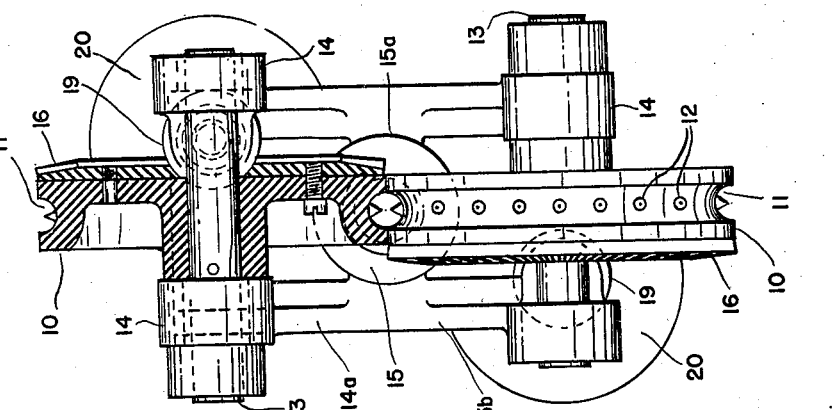
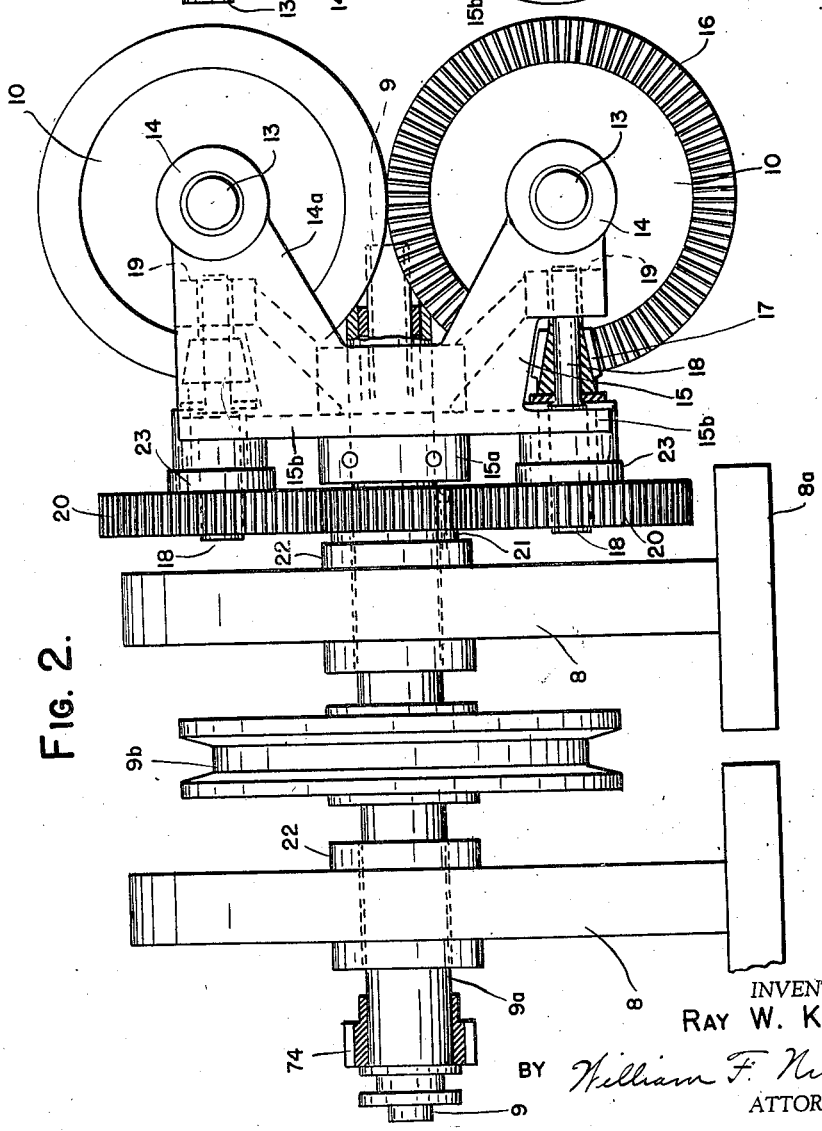
INVENTOR.
RAY W. KROUT.
BY William F. Nickel
ATTORNEY.

Dec. 10, 1940.  R. W. KROUT  2,224,400
CANDY-MAKING MACHINE
Filed Nov. 29, 1938   7 Sheets-Sheet 5

INVENTOR.
RAY W. KROUT.
BY William F. Nickel
ATTORNEY.

Dec. 10, 1940.  R. W. KROUT  2,224,400
CANDY-MAKING MACHINE
Filed Nov. 29, 1938  7 Sheets-Sheet 6
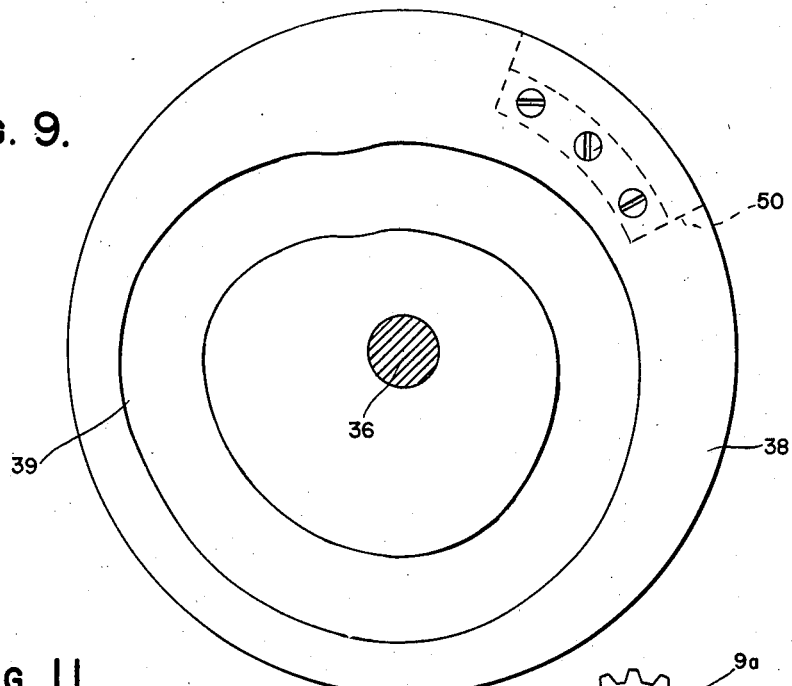
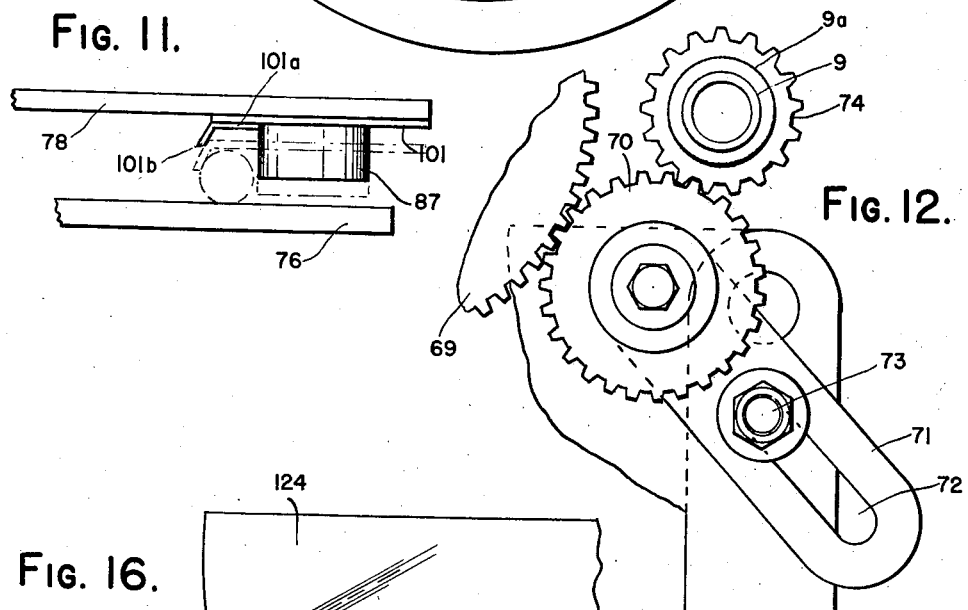
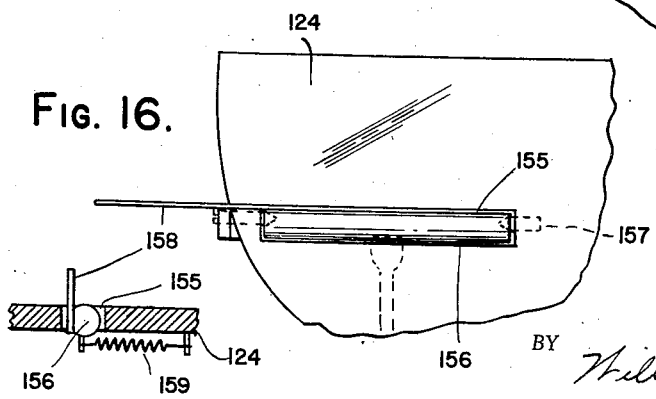
INVENTOR.
RAY W. KROUT.
BY William F. Nickel
ATTORNEY.

Dec. 10, 1940.  R. W. KROUT  2,224,400
CANDY-MAKING MACHINE
Filed Nov. 29, 1938  7 Sheets-Sheet 7
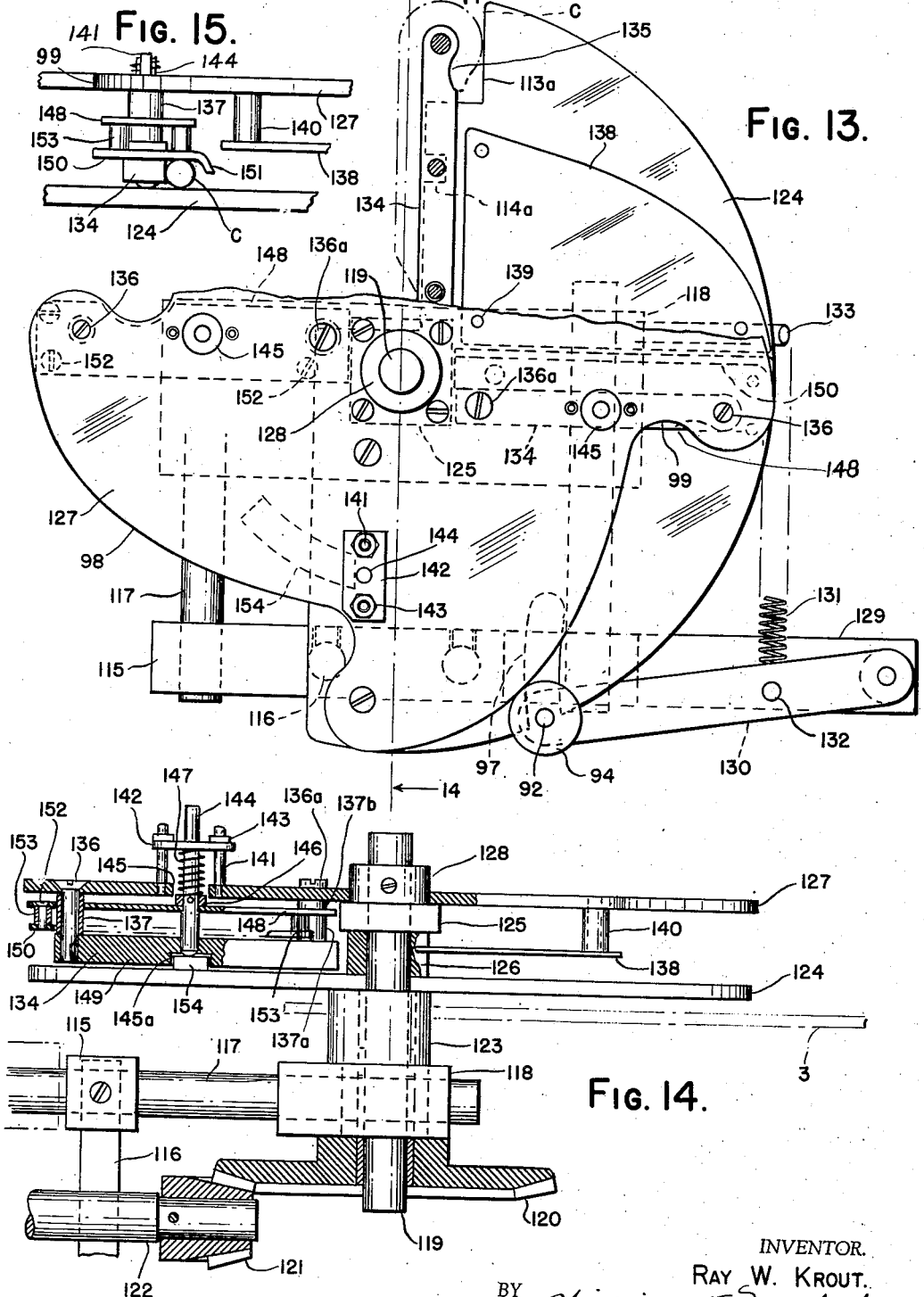
INVENTOR.
RAY W. KROUT.
BY William F. Nickel
ATTORNEY.

Patented Dec. 10, 1940

2,224,400

UNITED STATES PATENT OFFICE 2,224,400

CANDY-MAKING MACHINE

Ray W. Krout, Paterson, N. J., assignor to Charms Company, Bloomfield, N. J., a corporation of Delaware Application November 29, 1938, Serial No. 242,990

16 Claims. (Cl. 107—4)

This invention relates to improvements in candy-making machines and more particularly to apparatus for producing in quantity candies of elongated form with one end doubled back to give them the appearance of shepherds' crooks or canes.

An object of the invention is to provide a machine of the kind specified having means for making pieces or sticks of candy of predetermined length and thickness in plastic condition; bending each in turn at one end until it assumes the desired shape; and then expelling it upon a conveyor which removes the finished stick for cooling and packing.

A further object of the invention is to provide such a machine having a rotary member by which sticks of candy are carried to a selected point; where projecting ends thereof are acted upon by an unbalanced force, curled about a forming element and then discharged upon the conveyor aforesaid.

Another object is to provide such a machine having a stationary supporting member over which the sticks of candy are impelled by said rotary member, and which has a slot or recess in its edge; and a lever controlled by said rotary member and acting so that a part of its extremity is forced into the slot or recess to accomplish the bending at the right instant. This support also has a cut-out portion to permit the candy to drop upon the conveyor ready to receive it.

It is also an object of this invention to provide such a machine having a suitable ejector and means for causing it to act in a manner that ensures the transfer to the conveyor of each article of candy when the bending is completed.

A still further object is to provide a so called cane-making machine to which candy is fed and simultaneously twisted prior to being cut into separate pieces.

Yet another object is to provide a cane-making machine adapted to receive candy fed to it along a well-defined line coming from a mass or batch that is rolled or worked to convert it into an elongated body or long string; and having a cutter with a blade that severs a piece constituting a stick whenever a given length of candy has passed it. The body of the candy moves continuously and the cutter is actuated to travel with it while the cutter blade delivers its cutting stroke. The sticks therefore are straight, for the body is not arched or buckled when the blade of the cutter is pressed down on it, as it would be if the candy kept moving and the cutter, except for the blade, remained in one position.

An additional object of the invention is to provide a machine of the type outlined having means for timing the operation of the feeder, the cutter, the rotary member, and the bending lever, so that all of the necessary steps are performed in the proper order and each at the correct instant.

In practice the machine consists of the fewest possible number of parts, is easily assembled, certain in operation and capable of a large output, and not too costly to set up and operate.

The nature of the invention will be set forth in the ensuing description taken with the accompanying drawings which show several embodiments of the invention.

On said drawings:

Figure 2 is a side view of the combined feeder and twister;

Figure 3 is a front view of the twister and feeder, partly in section;

Figure 9 is a top plan of the cam which imparts motion to the cutter;

Figure 11 shows an attachment on the rotary member to engage each stick of candy when it is being moved over the surface of the stationary member;

Figure 12 shows a detail;

Figures 13 and 14 are respectively top and side views of another design of apparatus embodying this invention; Figure 14 being mostly in section along line 14—14 of Figure 13;

Figure 15 shows in end view the retainer and ejector thereof; and

Figure 16 illustrates an attachment to give each stick of candy its correct position on the stationary member thereof before the bending is started.

The same numerals identify the same parts throughout.

Figure 1:
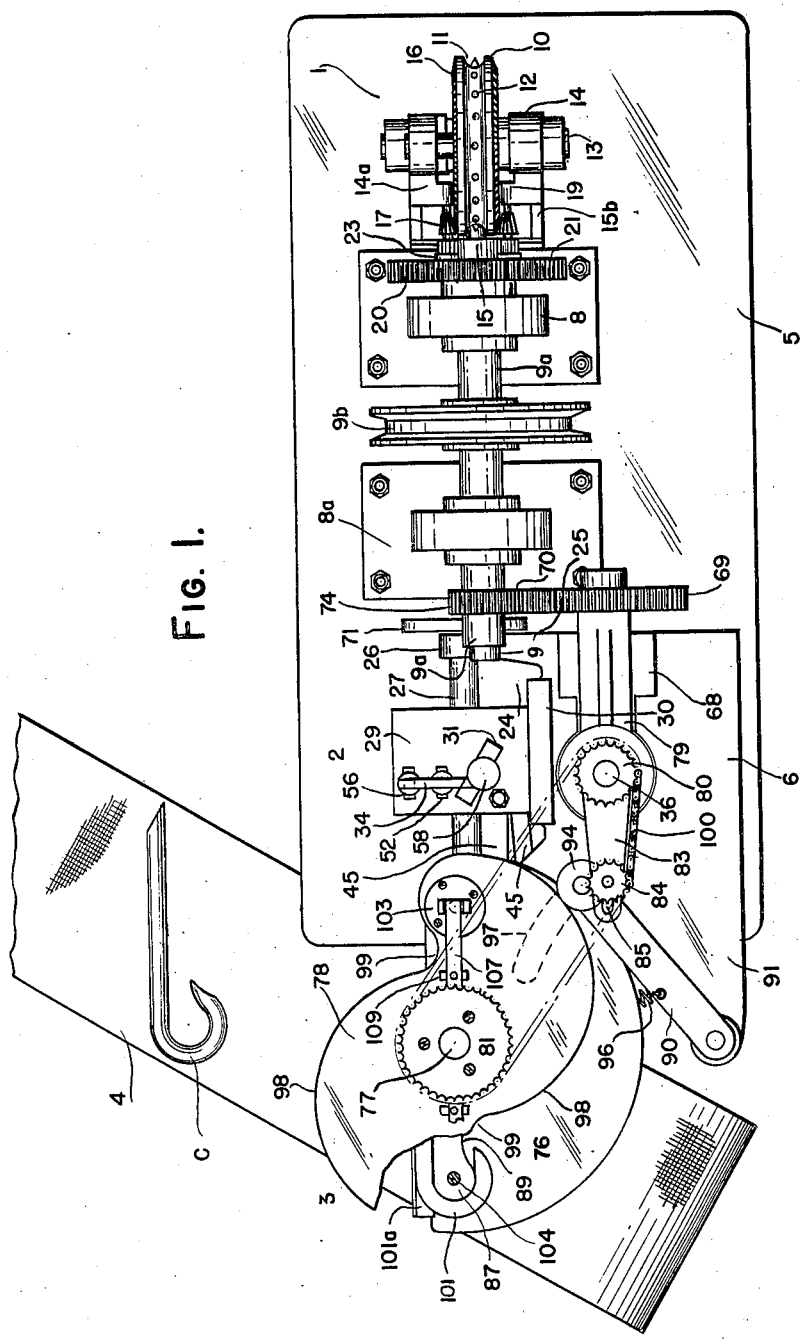
Figure 1 is a top view of the machine.

The general arrangement of the various parts of the machine is presented in Figure 1. The apparatus comprises a combined sizing, twisting and feeding device indicated as a whole by numeral 1. This device draws in an elongated body of candy which comes from a mass or batch, not shown, that is rolled or otherwise worked to thin it out. When the feeder draws it from this batch it is round and substantially rope-like in form and still soft and plastic. This body or string of candy is twisted and sized by the device 1 and then transmitted to a cutter 2, which severs successive pieces of the required length. These pieces are delivered to the forming section of the machine indicated by the numeral 3, and finally discharged when finished upon a belt or conveyor 4 which removes the candy canes (indicated at C in Figure 1) for cooling and packing. The working parts of the machine are supported upon a bedplate or base 5. Above it is a platform 6 or rest for the cutter 2 and the principal parts of the operating gearing. This platform 6 is connected to the base 5 by legs 7. The mode of operation of the machine, to be more fully described hereinafter, is such that the end of the elongated body of candy passes the cutter 2 and enters the forming section. The candy is then cut at a point outside of the forming section 3. The resulting stick has its extremity protruding from said section and said extremity is next turned over around the end of a suitable element to make the crook or bend thereat. The cutter 2 must move as a unit with the candy when the cutting stroke begins; otherwise the successive pieces or sticks would not be straight. Since the twister works continuously, if the cutter were not moved, the string, reaching the cutter, would be arrested by the blade and arched or buckled before the cutting is completed. But by mounting and connecting the cutter so that it moves with the candy while the cutting is being done, the elongated body of candy that is fed to the cutter is not obstructed and the sliver as it is cut is not arched or buckled as it would be if the cutter were stationary. Thus by the motion of the cutter forward with the candy as the cutting stroke takes place the correct and continuous operation of the machine is facilitated.

Adjacent the feeder and twister a pair of bearings supports or posts 8 are mounted upon the bed plate 5, resting on feet 8a. In these bearings is a tubular guide 9 fixed in a tubular shaft 9a which directly engages the bearings on both posts and turns freely therein. Between these posts on the shaft 9a is a pulley 9b to which power is supplied to operate the whole machine. The numeral 10 includes a pair of rotatable feeder elements in the form of wheels having grooves 11 in their peripheries with pins or studs 12 in these grooves. These elements 10 lie in a single plane and their rims are substantially tangent at one point, so that the grooves of the two wheels form in effect a circular opening at this point, which is in line with the guide 9. Each of the wheels 10 is mounted upon a journal 13 in bearings 14 which are carried by a head 15 rigidly mounted on the shaft 9a to turn therewith. This head 15 has a central hub 15a and projections 14a carrying the bearings 14 and connected by arms 15b to hub 15a. The wheels 10 each have gear teeth 16 on one face meshing with pinions 17. These pinions are mounted on shafts 18 supported at one end in bearings 19 on the projections 14a and passing through openings in the parts 15b at the other end. Both shafts 18 also carry gears 20 fixed thereon and meshing with a fixed gear 21 secured against rotation to a fixed projection 22 around the bearing in the adjacent post 8. Pinions 17 are fast on shafts 18.

With this construction it will be seen as the shaft 9a is turned by the pulley 9b the revolution of the head 15 causes the gears 20 to roll on fixed gear 21, and pinions 17 therefore will turn the wheels 10 on the journals 13. The candy coming from the batch is pushed forward by the pins 12 and forced by the wheels 10 into the guide 9 and the depth of the grooves 11 sizes the candy so that it will easily pass through the guide 9. At the same time the rotation of the head 15 causes the rotating wheels 10 to revolve with the guide 9 and shaft 9a about the axis of this shaft so that the long soft body of candy is twisted as well as fed and sized. The gears 20 are spaced from the head 15 by means of sleeves 23. The pins are preferably rounded at their outer ends for a purpose to be stated later.

Figure 4:
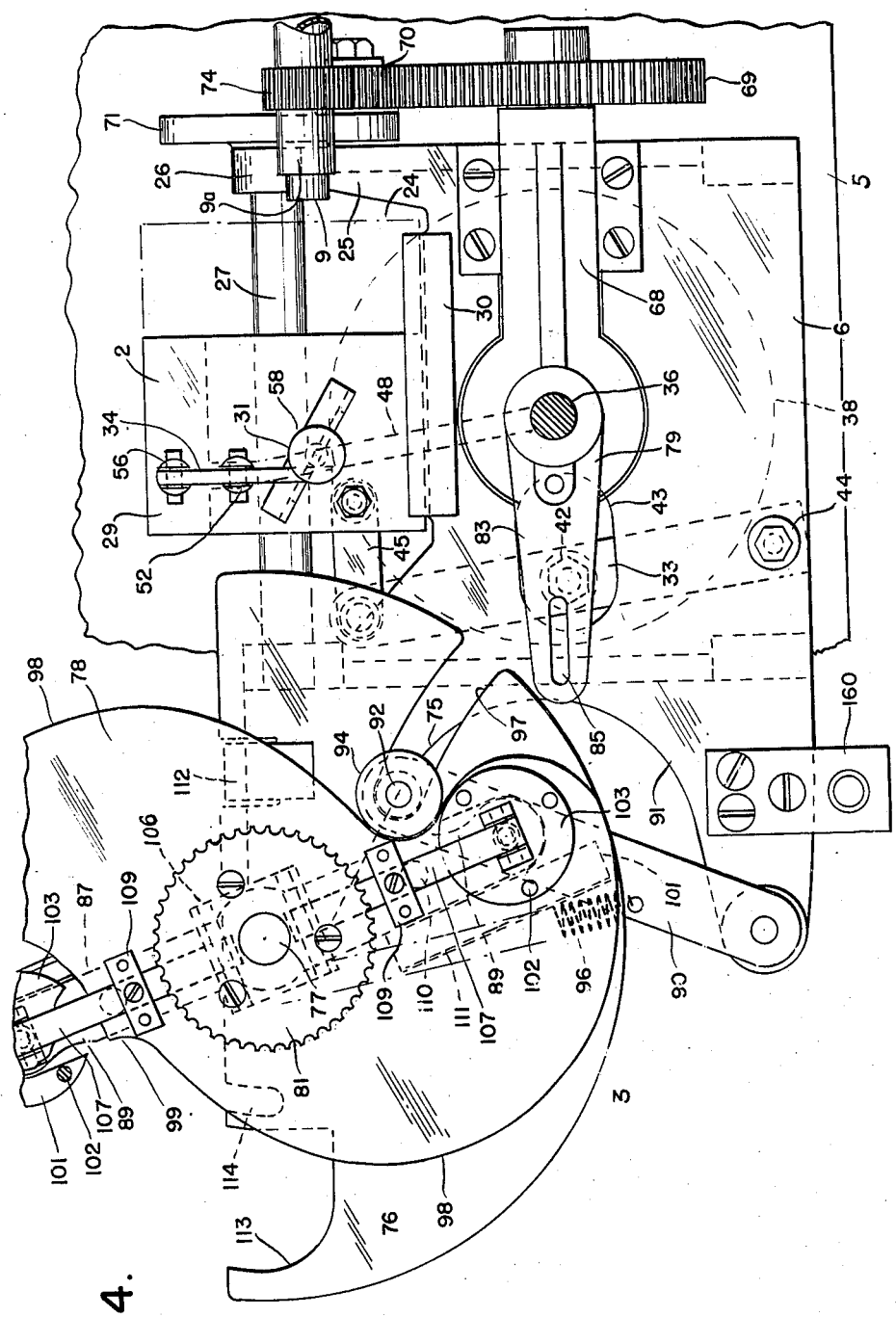
Figure 4 is a top plan enlarged showing the cutter and the stationary and rotary members which give the sticks of candy their form and then pass them on to the conveyor.
Figure 5:
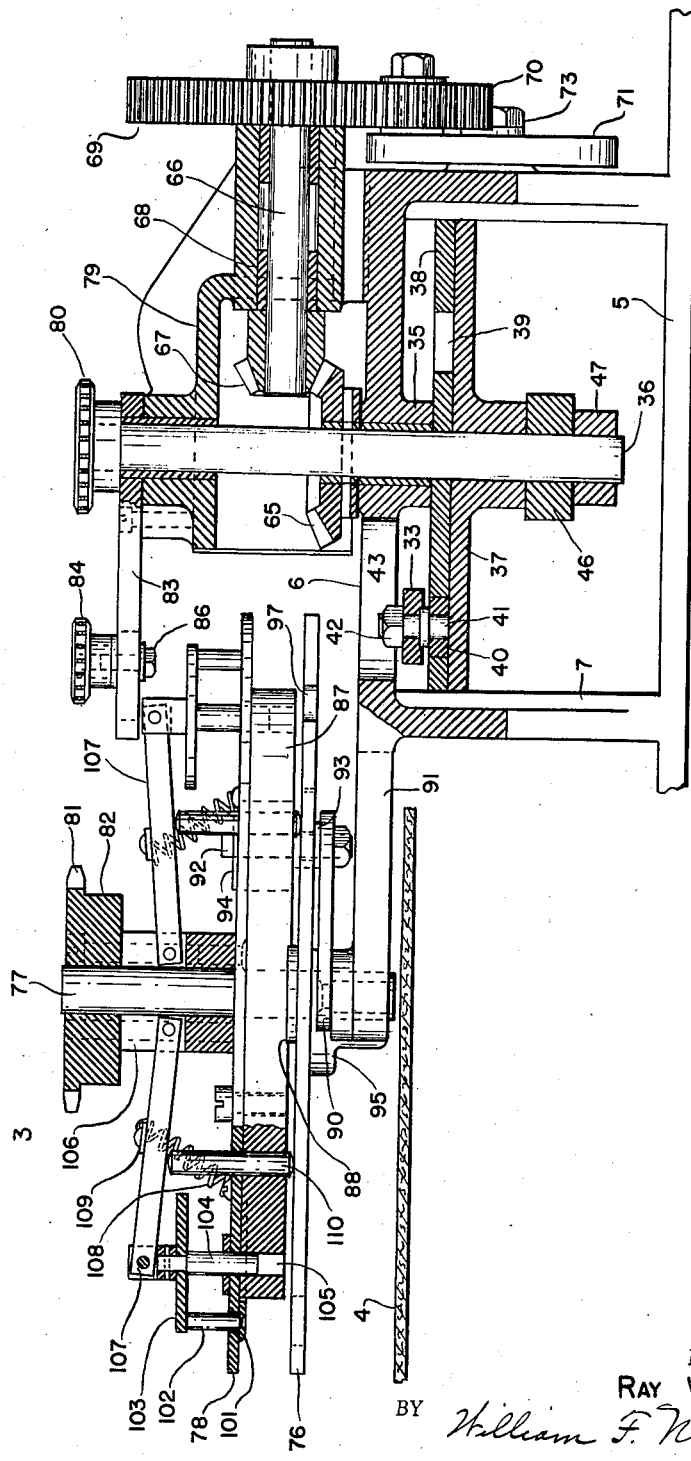
Figure 5 is a side view of what appears in Figure 4 with some of the parts in section.
Figure 6:
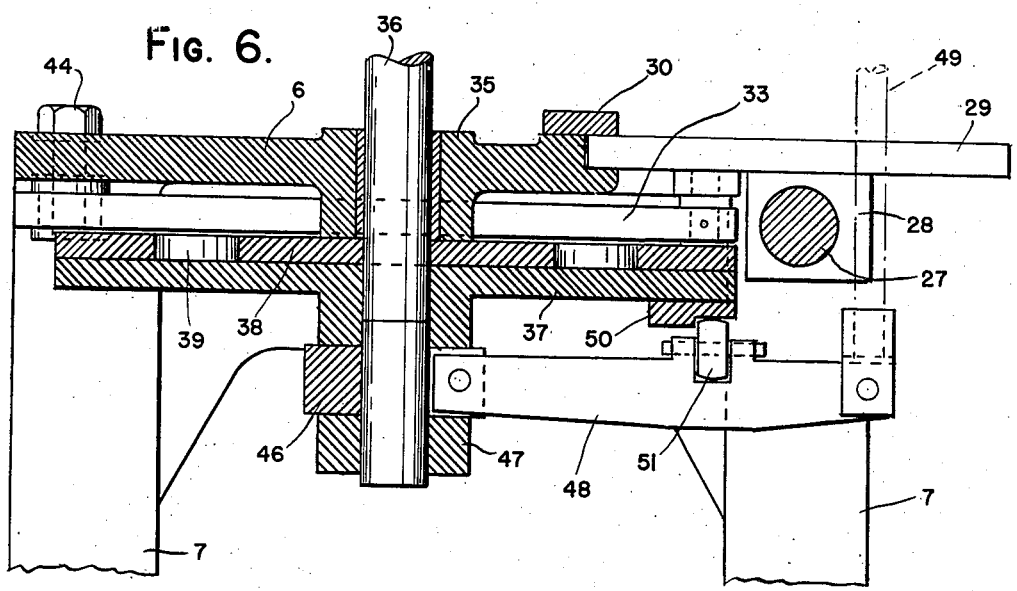
Figure 6 is a sectional view of portions of the apparatus shown in Figure 5 for controlling the operation of the cutter.
Figure 8:
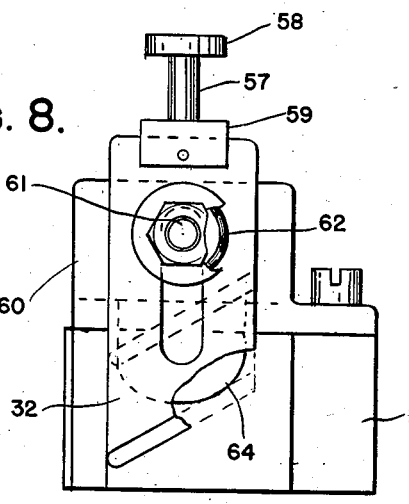
Figure 8 is a front view of the cutter guide post and the cutter therein.
Figure 7:
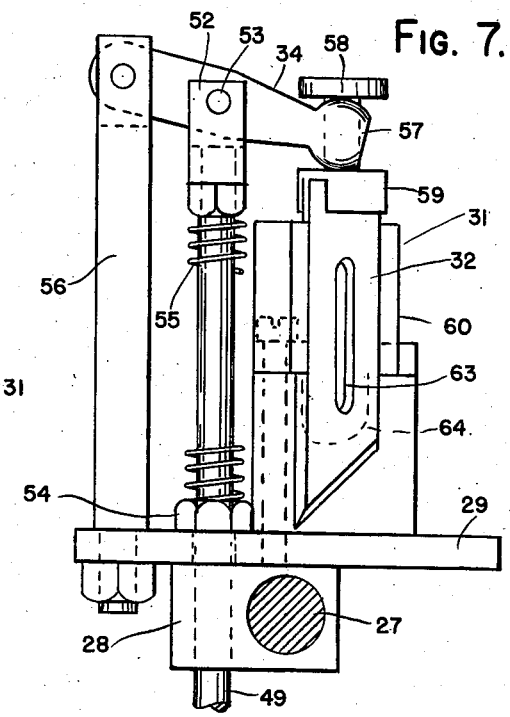
Figure 7 is a detail showing additional connections for operating the cutter.
Figure 10:
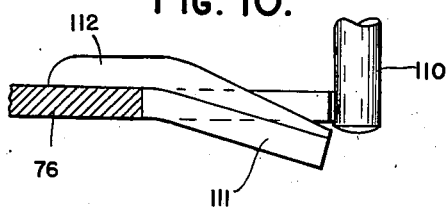
Figure 10 is a detailed view showing a portion of the stationary support having a cam to lift the ejector.

The platform 6 is recessed in the rear edge as shown at 24 and flanking this recess are arms 25 which support bearings 26. These bearings carry a horizontal guide rod 27 which passes through an opening in a block 28 secured to the bottom of the base plate 29 of the cutter; and along the inner edge of the recess 24 is affixed a channel-shaped guide 30 which receives one edge of the plate 29. This plate can thus be moved back and forth with respect to the guides 27 and 30. As shown in Figure 4 it is at the left end of the range and it can be moved from this point back to the position indicated by dot-and-dash lines. When it has been actuated to the extreme right the adjacent edge of the plate 29 will be close the delivery end of the twister tube 9. A guide post on the cutter is shown at 31 and mounted to move up and down in this cutter is a blade or knife 32 with a diagonal lower edge. Beneath the platform 6 is a lever 33 that is connected to move the base plate 29 back and forth on the guides 27 and 30 and at 34 is a lever which actuates the cutter blade 32 to cause it to deliver its working stroke.

The central part of the platform 6 has a vertical bearing 35 in which is mounted a rotatable shaft or spindle 36. This shaft supports a plate or disc 37 having a hub that can be secured to the shaft in any suitable way so that the rotation of the shaft carries the disc 37 with it. Affixed on the upper face of the disc 37 is a plate or disc 38 having a cam groove 39 therein. In this groove is a roller 40 on a pin 41 affixed by a nut 42 to the adjacent end of the lever 33. This lever 33 is pivoted at 44 to the underside of the platform 6 and is joined by a short link 45 to the lower face of the plate 29. Hence as the shaft 36 rotates the cam 38, the lever 33 is rocked and the cutter is moved back and forth on the guides which carry it. An aperture 43 in the part 6 gives clearance to nut 42.

Below the disc 37 on shaft 36 there is a loose head 46 lying between the hub of the disc 37 and a fixed stop collar 47. This head has a recess which receives the end of the lever 48 that is pivotally connected to the head 46 at one end and is pinned at its other end to a vertical link 49 which extends upward through the plate 29. Above the plate 29 the upper end of this link is pinned to the arm or lever 34 that actuates the cutter blade 32. The bottom face of the disc 37 has a cam projection 50 thereon and on the top of the lever 48 mounted in any suitable way is a roller 51 in position to be engaged by this cam. A cleft head on the upper end of the link 49 is shown at 52 and a pivot pin joining the arm 34 to the head 52 is shown at 53. The link 49 has a loose collar 54 which engages the top face of the base 29 and a spring 55 surrounds the link 49 between this collar and the head 52, so that whenever the arm 48 is depressed by the cam 50 this spring 55 is compressed, and when the cam 50 releases the arm 48 the spring 55 pushes the link 49 up and the arm 34 then rises. The plate 29 also carries a vertical post 56 which extends upward and has one end of the knife arm 34 pinned to its top. The link 49 is pinned to the arm 34 between this post and the cutter blade 32. This blade is operatively connected to the opposite end of the arm 34 by a stud 57 with an enlarged head or flange 58 at its upper end and an enlarged grooved base 59 which fits upon the top of the blade 32 and is riveted to it. The rounded end of the arm 34 lies between the flange on head 58 and the base 59 so that movement of the arm 34 actuates the blade 32 accordingly.

The upper portion of the guide post 31 has vertical guide ribs 60 between which the blade 32 moves. A bolt 61 passes through this blade and is fixed to this post, and between the head of this bolt and the face of the blade 32 is a spring 62 to hold the knife firmly against the face of the post. The opening for this bolt is elongated as shown at 63 so that the blade can move up and down on the bolt. A suitable washer on the bolt is retained by the head thereof, and provides a good seat for the spring 62. In the post is an opening 64 through which the candy passes to be severed by the blade 32, and this opening is a little above the plate 29, in line with the tube 9.

The shaft 36 carries above the platform 6 a gear 65 resting on the top of bearing 35. This gear is turned by a shaft 66 carrying a pinion 67 and the shaft 66 is mounted in a bearing 68 at one side of the platform 6. This shaft also carries a gear wheel 69 which is turned by a gear wheel 70 pivoted at the upper end of the arm 71. This arm 71 has a slot 72 and it is held in position on one of the legs 7 by a bolt 73. The slotted arm can be adjusted into the position required. The gear 70 meshes with the driving pinion 74 on the hollow shaft 9a.

It will be obvious that as the twister and feeder rotates, and the candy traverses the tube 9, the end of the candy as it emerges from the delivery end of the tube will pass over the plate 29 and through the opening 64 in the guide post 31. After the previous stroke the cutter will be moved back to the dot-and-dash line position indicated in Figure 4. The twister will drive the gear 70 and the gear 69 to turn the shaft 66 and the gears 65 and 67. Therefore the shaft 36 will be turned and at the right moment, the cam 39 will give movement to the lever 33 to swing the cutter to the left so that it shifts with the candy. This movement should begin at substantially the instant when the cam 50 is ready to depress the arm or lever 48. When the lever 33 has pulled the cutter as far to the left as it can go, the downward movement of the blade 32 should be complete. The cam 50 then releases the arm 48 so that the spring 55 can quickly raise the cutter knife 32. The cutter is then returned to starting position at the right while the candy continues to go in the opposite direction through the aperture 64 in the post 31. This mode of operation enables the cutter not only to sever one stick after another from the elongated body of candy but it also tends to help the feeding because the cutter moves in the same direction as the candy, and, from the instant when the knife strikes the top of the candy until the instant when it has completed its stroke, this blade will push the candy on ahead of it. At the same time the candy behind it can remain straight and is not arched or buckled as it would be if the cutter blade did not move to the left with the candy when the cutting stroke is made. The plane of the blade 32 is diagonal with respect to the line of feed, and this makes the ends of each stick bevelled as shown in Figure 1. A funnel-shaped guide leading to opening 64 may be mounted on plate 29 if desired.

As the cutter functions to cut off one stick after another the sticks are finished by turns in the forming section 3. The stationary and rotary members of this section are mounted upon a lateral extension 75 (Figure 4) at the left rear corner of the platform 6 and power is transmitted to the rotary member from the shaft 36. The stationary member or support is in the form of a semi-circular plate 76 secured upon an upright journal 77 mounted in the outer end of the extension 75 and passing upward through the rotary member 78. The stationary member 76 has one end projecting over the platform 6 towards the cutter base plate 29. When the blade 32 finishes its cutting stroke the greater part of the length of the stick is already upon this member 76; one extremity thereof being near the journal 77 and the other extremity projecting beyond the curved edge of the stationary member. The rotary member 78 (Figures 1 and 4) has an opening through which the journal 77 passes and revolves about the latter. The bearing 68 on the platform 6 has an upper horizontal extension 79 in the end of which is a vertical bearing for the upper end of the shaft 36, and above this bearing the shaft carries a sprocket gear 80. Over the rotary member 78 is a sprocket 81 having a hub 82. This gear is rigid with the rotary member 78 but free to turn on the journal 77 and below the gear 80 is an arm 83 held in fixed position on the extension 79 and supporting a tightening gear 84. The end of this arm has a radial slot 85, and through this slot passes a bolt forming a journal for the gear 84 and secured in place by a nut 86.

Fastened to the bottom of the rotary member 78 is a molding element or bar 87 extending from one end of the rotary member to the other end having an opening at the center for the journal 77. This journal has a washer 88 thereon between the stationary member 76 and the bar 87 so that there is a small clearance between this bar and the stationary member. The opposite outer ends of this bar are rounded, and each bar has on the rear or trailing side thereof a shallow rounded recess 89 near the outer end. The bevelled projecting end of each stick is pressed, in a manner hereinafter set forth, into this recess.

To curl or bend over the projecting ends of the sticks of candy a forming lever 90 is mounted on another lateral extension 91 at the left front corner of the table 6. This lever has on its free end a stud or journal 92 surrounded by a washer 93 resting on top of the lever 90. On top of the washer is a bending roller 94. The washer 93 is of such thickness that the lower side of this roller is supported just above the top face of the member 76. To ensure proper action of the lever it must swing in a horizontal plane just under the member 76, and for this purpose the outer end of the extension 75, which is at the same level as the extension 91 is made with a projection or thickened outer end 95 on which the stationary member 76 rests and in which the stud 77 is fixed. A spring 96 is connected to the lever 90 at one end and to the bottom of the member 76 at the other and acts to pull on this lever so that the outer end thereof tends to move in towards the center of the member 78. The curved edge of the member 76 has a slot 97 extending into the same adjacent the stud 92 and when the member 78 is in the right position the spring 96 will move the lever so that the washer 93 can move into this slot 97. At that time the roller 94 moves over the upper face of the plate 76 and bends the outer end of a stick in position there around the extremity of the bar 87.

The rotary member has curved edges 98 with concave or reentrant portions 9, these concave portions being of substantially the same curvature as the roller 94. The driving chain for transmitting motion from the gear 80 to the gear 81 is shown at 100.

This part of the machine is so timed that, with the member 78 revolving clockwise, the convex portions of this member engage the roller 94 and hold the lever 90 at the extreme right of its movement until one of the concave recesses 99 comes into position adjacent the roller 94. Before this takes place a stick of candy is pushed upon the member 76, with its end adjacent the cutter protruding. In this position the candy is engaged by the flat leading side of one half of the bar 87 and impelled sidewise ahead of this bar along the top of the support 76 until it overrides the slot 97. Just before this half of the bar 87 reaches the adjacent end of the slot, the outer end of the stick will strike the roller 94 and begin to be bent backward; the other end being firmly held against the advancing face or flat side of the bar so as to keep it in substantially radial position. As soon as the candy has passed over the slot, the member 78 uncovers the recess or slot 97 and the stud 92 with its washer 93 then enters the slot and the lever is swung to the left by the spring 96. The bending of the candy is then completed, and the bevelled extremity of the stick is forced into the hollow recess 89 by the roller 94, so that the hook on the end of the stick is turned out slightly as indicated in Figure 1 as the bending is finished. Then the next convex portion 98 of the member 78 engages the roller 94 and returns the lever to starting position. This operation takes place twice in each revolution as successive sticks are picked up by the two halves of the bar 87, and impelled across the member 76 in this way. This bar can of course be in two pieces as well as one.

To make certain of holding each stick in place as it is bent and of the discharge of each of the candy canes upon the conveyor, combined retainer and ejector elements are carried on the lower face of the member 78; one adjacent each end of the bar 87. This ejector element comprises a flat curved strip 101 rigidly united with a straight retainer strip 101a at the leading face of the neighboring bar 87, and having along its forward edge a downturned portion forming a radial flange 101b to hold the stick against the front side of said bar 87 and keep the inner end thereof from being swung away from this bar when the outer end of the stick is bent over. Each curved piece 101 is riveted to the lower ends of the guide studs 102 fastened at the upper ends to a disc or head 103 above the rotary member 78; which is of course perforated to enable the studs to pass upward through it. Each head 103 has a central stud 104 which slides in an opening 105 in the member 78 and associated end of bar 87 so that the head is properly guided when depressed. The hub 82 of the gear 81 has a hollow boss or extension 106 which is of course rigid with the gear 81 and the member 78, to joint the gear 81 to said member; and has recesses in the sides thereof with pivot pins on which are mounted levers 107. Each lever is secured at its outer end to a pin in projections at the upper end of the stud 104 above the disc 103, and the levers are normally pulled downward by springs 108 made fast at their lower ends to the member 78 and at their upper ends to crossbars 109 on the levers 107. Below each lever is a plunger 110 mounted to slide freely in an opening in the bar 87 and member 78, and adapted to press at its upper end against the lower side of the lever 107 and to slide at its lower end along the upper face of the member 76. As illustrated in Figures 1 and 4, there are two of these retainer and ejector elements.

So long as the plunger 110 runs on top of the member 76 the lever 107 over it is pushed up but when the plunger runs over the edge of the member 76, at the left of Figure 4, for example the plunger 110 drops and the springs 108 then force the lever 107 downward to make the ejector expel the candy. When, however, the half of each bar 87 reaches the other half of the straight edge of the member 76, in proximity to the cutter, this edge being parallel to the guide 27, it encounters a bent-down portion 111 of the member 76 on which is a lift cam 112 that pushes the plunger 110 upward and makes the lever 107 elevate the ejector and retainer.

In practice whenever a stick of candy is pushed upon the member 76 it extends along the top thereof adjacent the edge having the cam 112. When either half of the bar 87 arrives at the cam 112, the plunger 104 is raised, and so are the strips 101 and 101a. The flange 101b is lifted over the stick, and then the lower end of the plunger drops upon the member 76, with the rib 101b overlapping the stick of candy and in front of it. The retainer strip 101a does not press upon the candy, and the bar 87 now strikes sidewise against the stick, pushes the stick ahead of it, and propels it over the slot 97. Along the entire surface of the member 76 the flange 101b on the strip 101a keeps the stick of candy lined up against the front of the bar 87, even when the outer end strikes the roller 94. Just before the stick reaches the slot 97 the roller 94 begins to bend the end of the stick over the curved end of the bar, and when the member 78 crosses the slot 97 the roller continues to fold the end of the stick and forces it against the rear side of the bar and into the concave recess 89. After the bending is completed the stick is impelled around to the straight edge of the member 76 where the crook in the end thereof comes to a recess 113. Adjacent this recess is a notch 114 in the member 76 which releases the plunger 110. As soon as this plunger drops the springs 108 pull down the levers 107 and cause the parts 101 and 101a to move downward together to discharge the cane upon the belt 3. This ends the operation and the canes on the conveyor are carried away to be dried and packed. The flanges 101b prevent the sticks of candy from being revolved at their inner ends about the extremities of the bar 87, when the roller 94 engages the sticks.

The operation of the machine is continuous because the candy is continuously twisted and fed by the wheels 10 into the tubular guide 9, issues therefrom and is pushed over the plate 29 to be cut. By the time each stick is cut off it rests upon the member 76 and is ready to be pushed around by whichever half of the bar 87 is first to engage it. The duplicate curved parts 98—99 of the member 78 so control the roller 94 that the extremities of the sticks are bent over and given the shape desired.

In Figures 13 to 16 inclusive a modification is presented. Here the rotating member of the forming device has four cam portions 98—99 and therefore makes four canes per revolution. This machine is therefore adapted to turn out candy canes more rapidly, especially canes of smaller size. The sizing, feeding, twisting and cutting are done as before.

The main parts of this modification are supported by a framework consisting of a beam 115 mounted on posts 116. From the beam extend lateral arms 117 which carry at their outer ends a main supporting part 118 having a bearing at the center for a shaft 119 by which the rotary member is turned. On the shaft below the part 118 is a gear 120 which is rotated by a pinion 121 on a shaft 122. The pinion 121, as before, is driven through gearing from the shaft 9a.

On the top of the part 118 is a spacing sleeve 123 which holds up the stationary member 124 and above this stationary member is a square collar 125 on the shaft 119. This collar rotates with the shaft, and between this collar and the member 124 is another spacing sleeve 126. The rotary member 127 rests upon and is secured to the square collar 125, and this member has an opening at the middle to receive a round collar 128 fixed to the shaft 119. The member 127 thus surrounds the collar 128 which is of smaller diameter than the collar 125, and serves as a stop to hold the shaft 119 in place.

To one end of the beam 115 is attached an extension 129, to the outer end of which is pivoted the lever 130. The end of this lever carries a stud 92, washer 93 and roller 94 in the same relation as before, so that this lever can move when the rotary member 127 uncovers the slot 97 in the member 124. A spring 131 is affixed at one end to a stud 132 on the lever and at the opposite end to the stud 133 in the end of the part 118.

The forming bars are shown at 134 under the member 127 and having flat front sides with concave recesses 135 and rounded outer ends. These bars are secured by screws 136 surrounded by spacing elements 137 so that the forming bars are disposed a short distance below the member 127, and between the bars are plates or "decks" 138 fastened to the lower faces of the rotating member 127 by screws 139 and spacing sleeves 140 thereon. These decks are approximately quadrantal in form and they are about the same distance from the member 127 as the tops of the bars 134. These decks lie between the two members 124 and 127 and the sticks of candy are forced in beneath these decks when they are transmitted to the stationary supporting member 124. Projecting from the top of the member 127, adjacent each forming bar are bolts 141 connected at their tops by a perforated bridge piece 142. These bolts may be shouldered at their upper ends so as to hold up this bridge piece and nuts 143 hold this piece tight. Through an opening at the middle of the bridge piece extends a plunger 144 which goes downward through an opening 145 in the member 127 and is encircled by a collar 146 small enough to fit inside the opening 145. Between this collar and the piece 142 is a spring 147 surrounding the plunger. The washer 146 normally rests upon the ejector strip support 148 and this strip is perforated to give passage to the plunger, which has a shoulder 149 below it, so that this support 148 is gripped firmly between the shoulder and the washer. The forming bars below these supports are bored to permit the plungers to work up and down through them. Each adjacent strip support is fixed at its end adjacent the shaft 119. For this purpose screws or rivets 136a passing down through the rotary member and the ejector supports into the forming bars 134 are used. On the screws are spacing washers 137a between the supports and the rotary member 127, and other washers or sleeves 137b between the bars and supports 134. These supports are normally set in horizontal position but are resilient so that the outer ends can be depressed.

The ejector and retainer elements are shown at 150. They extend along the front flat sides of the bars 134 near the tops and curve around the ends like the parts 101 and 101a; and the straight parts of these elements have bent down flanges 151, like the flanges 101b. These elements 150 are made fast under supports 148 by rivets 152 surrounded by spacing sleeves 153 and when the plungers 144 are pressed down the elements 150 are lowered. As long as the plungers 144 run upon the top of the member 124 the elements 150 are held up. Enough room exists between the decks and bars 134 for the elements 150.

On the member 124, however, is a cam 154 which pushes the plunger 145 up just before the associated forming bar reaches the stick of candy; and the flange 151 on the element 150 is lifted so that it can clear the stick. This cam ends at the position of the candy on the member 124, and each bar 132 is recessed at 145a to clear the cam 154.

Adjacent the point where the candy arrives upon the member 124 this member has an elongated radial opening 155 in which is a cylindrical bar 156 mounted on pointed pivot screws 157, mounted in bearings on the bottom of member 124. In the opening a metal strip 158 is affixed to one side of this bar. This strip 158 has one edge higher than the top of the member 124 and extends beyond the periphery of said member. A spring 159 fixed to a pin on the bottom of the member 124 and to a pin on the bottom of the bar 158 tends to hold the bar in such a position that the strip projects vertically above the face of the member 124. When the candy is fed to the member 124 it runs along in front of the strip 158, between it and the advancing element 134 and when the element 134 starts to move the stick the strip 158 is knocked down against the member 124 and the candy slips over it.

The candy sticks are delivered to the member 124 and lie alongside of the strip 158. Ordinarily the lever 130 is held outward by the projecting portions of the rotating member 127. As this member revolves the plunger 144 runs upon the cam 154 as each forming bar approaches the stick. When it strikes the stick the strip 158 is turned downward, the stick is propelled over this strip, and as soon as the cam 154 releases the plunger 145, the spring 147 forces the support 148 down (but does not make the element 150 press on the candy) so that the flange 151 prevents displacement of the stick as above described. When the rotating member 127 carries a recess 99 into position to allow the lever 130 to act the stick is bent at its outer extremity as before. When the bending is finished the candy is carried around to the straight edge of the member 154 which has a recess 113a and a recess 114a. The latter releases the plunger 144 and the element 150 then throws the candy down on the conveyor, the bent end thereof passing through the space 113a.

The top 6 may have a projecting bracket 160 attached to the extension 91, to serve as an alternative point of support for the bending lever, as desired. See Figure 4.

The stationary member 124 is approximately semi-circular as shown in Figure 13, and the cam 154 projects over one edge thereof and raises the lower end of which the plunger 144 as it is being carried toward the stationary member, after dropping at the recess 114a, the same as does the lift cam 112.

The pins 12 with rounded ends give a decided practical advantage. It has been the custom in the building of sizing rolls, such as are shown at 10, to cut or ridge the grooves 11, or knurl them so that each sizing roll will have a certain bite into the material it is working. Otherwise, the rolls would give no traction and would not function at all. I have found that such methods of roughening the surface of the grooves 11 interfere with the sheen on finished candy. I therefore shape and mount the escutcheon pins 12 in such a manner that the end of each pin will sink into the material sufficiently to give it traction without breaking the surface. The only marking of the surface is a depression made by the pin which is readily smoothed out by subsequent forming, leaving no scar on the surface of the candy. The ends of the pins 12 are therefore rounded so as to press into the material but not break the surface. This is quite important in a sizer for candy having a high exterior gloss.

It is to be also observed that the sizing unit comprising the rolls 10 twists as it sizes. This result is essential in the manufacture of pieces where a spiral stripe effect is desired. The automatic twisting of the stripe gives a uniform spiral as compared with twisting by hand. Where the spiral effect is not desired, I may eliminate the revolving sizers and instal an ordinary set of sizing rolls to feed the candy without twisting.

Another advantage of the invention is the adjustability of the machine to various lengths or sizes of candy canes. This is done by the use of different chain gears which change the ratio between the cut off and the amount of feed of the sizer rolls.

While the machine described herein has the preferred construction set forth, I of course may resort to many variations in design, without departing from the principle of the invention or exceeding the scope of the appended claims.

Having described my invention, what I believe to be new and desire to secure and protect by Letters Patent of the United States is:

1. A candy-making machine comprising a tubular guide, a cutter in line with said guide to sever pieces of candy in succession, superposed members one of which is rotatable in line with said cutter to receive said pieces separately, means for moving the cutter towards and from said members and means for bending over an end of said pieces.

2. A candy-making machine comprising a tubular guide through which an elongated body of candy is transmitted, a cutter in line with said guide to sever pieces of candy in succession, and members for receiving said pieces from said cutter and bending over one end of each, means for moving the cutter towards and from said members, means for rotating said guide, and connections between one of said members and said guide.

3. A candy-making machine comprising a tubular guide through which an elongated body of candy is transmitted, a cutter in position to receive said candy and sever pieces therefrom, members to which the candy is delivered from the cutter and by which said pieces are controlled to be successively bent at one end, means for rotating said guide, and connections between said guide, said cutter, and one of said members to operate same, said connections embracing means for actuating the cutter towards and from said members.

4. A candy-making machine comprising a feeding device, a cutter, superposed forming members, one of which is rotatable, a shaft driven by the feeding device, cams rotated by said shaft, connections to move the cutter towards and from said members and enable said cams to operate the cutter, and connections from said shaft to the forming members to control the latter.

5. A candy-making machine having a molding element with a rounded end, one side of said element being concave adjacent said end, means for revolving said element and means movable parallel to the plane of revolution of said element for bending a piece of candy around said end against said concave surface.

6. A candy-making machine comprising a stationary support to which elongated pieces of candy are delivered in succession, a rotatable member carrying a molding element to engage the side of each piece of candy and impel it over the surface of said support, and means for bending said piece around the end of said molding element.

7. A candy-making machine having a stationary support, a rotatable member, a molding element carried by said member above said support to engage a piece of candy and impel it sidewise over said support, the latter having a slot in its edge, and a lever having a part to enter said recess and bend the candy around the extremity of said element when the latter passes said slot.

8. A candy-making machine comprising a stationary support, a rotatable member having a molding element above said support to engage the side of a piece of candy and impel it over the surface of the support, a lever mounted adjacent to said support, the edge of said support having a slot and the lever carrying a part to enter said slot to bend said candy around said element as it passes said slot, said rotary member being cam-shaped with reentrant portions to permit said lever to enter said slot.

9. A candy-making machine comprising a support to which a long piece of candy is delivered, a rotatable member having a molding element to engage side of said candy and impel it over the surface of said support, retaining means for keeping said candy adjacent said element, and an ejector element to release said candy from said molding element at the edge of said support.

10. A candy-making machine comprising a support, a rotary member having a molding element, bending means controlled by said member, an ejector carried by said support, and a plunger carried by said rotary member and engaged by the support to hold said ejector inoperative until it passes the end of said support.

11. A candy-making machine comprising a stationary support, a rotary member carrying a molding element above said support, means for cooperating with said element to bend the end of a piece of candy around the extremity of said element, a flanged retaining and ejector strip carried by said member adjacent said element, and having a curved end portion adjacent the end of said element, a head above said member having projections passing through said member to engage said strip, a spring-pressed lever mounted on said member and connected to said head, and a plunger mounted in said member abutting said support and said lever, said plunger releasing the lever to depress the strip when it passes over the edge of the support, the latter having an inclined cam at the point where the plunger again arrives at said support to raise the plunger and hold the strip inoperative.

12. A candy-making machine comprising a feeder and twister, a cutter, a forming section, a rotatably-mounted tubular guide to delivery an elongated body of candy from the twister and feeder to the cutter, supports in which said guide is mounted, and a driving pulley on said tube between said supports, and driving connections between said guide and said cutter and forming section to operate and control them, said connections embracing means for actuating the cutter towards and from said members.

13. A candy-making machine having a forming element with a rounded surface a rotatable member carrying said element, a lever having a fixed pivot at one side of said member a spring connected to move the lever towards the center of said member to cooperate with said element and bend a piece of candy around said surface.

14. The candy making machine according to claim 13, wherein said machine has also an ejector device, and means for operating said device to expel the candy from said machine after bending.

15. Candy making apparatus comprising a forming member, means for rotating said member, an element carried by said member having a rounded surface against which a piece of candy stock is bent to provide a hook thereon, an element on said member to engage and keep the piece in place with respect to said first-named element, and a lever to cooperate with said first-named element during the bending operation.

16. Candy making apparatus comprising a forming member, means for rotating said member, an element carried by said member having a rounded surface against which a piece of candy stock is bent to provide a hook thereon, a lever to cooperate with said element in bending the candy, an ejector in said machine for said piece, and means connected to be operated in unison with the first-named means and actuated thereby to cause the ejector to expel the piece from said apparatus after the bending is effected.

RAY W. KROUT.